(12) United States Patent
Minckler

(10) Patent No.: US 8,344,872 B2
(45) Date of Patent: Jan. 1, 2013

(54) SYSTEM AND METHOD FOR SENSING PRESENCE OF MEDIA IN A MAILING MACHINE

(75) Inventor: Kevin M. Minckler, East Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 453 days.

(21) Appl. No.: 12/635,331

(22) Filed: Dec. 10, 2009

(65) Prior Publication Data

US 2011/0140879 A1    Jun. 16, 2011

(51) Int. Cl.
*G08B 23/00* (2006.01)

(52) U.S. Cl. ..... 340/501; 340/524; 340/541; 340/545.6; 340/550; 340/679; 705/401; 705/405; 705/408; 705/410

(58) Field of Classification Search ............... 340/501, 340/524, 541, 545.6, 550, 679; 705/401, 705/405, 408, 410

See application file for complete search history.

(56) References Cited

U.S. PATENT DOCUMENTS

| | | | | |
|---|---|---|---|---|
| 4,347,506 A * | 8/1982 | Duwel et al. | | 340/679 |
| 5,999,921 A * | 12/1999 | Arsenault et al. | | 705/410 |
| 6,023,690 A * | 2/2000 | Chrosny et al. | | 705/405 |
| 7,424,436 B2 * | 9/2008 | Katikaneni et al. | | 705/60 |
| 2004/0212684 A1 * | 10/2004 | Silverbrook | | 348/207.2 |
| 2007/0065207 A1 * | 3/2007 | Margolis | | 400/76 |

* cited by examiner

*Primary Examiner* — Tai T Nguyen

(74) *Attorney, Agent, or Firm* — George M. Macdonald; Charles R. Malandra, Jr.; Steve J. Shapiro

(57) ABSTRACT

A sensor is paired with an emitter, such as in a postage metering machine, and the sensor is calibrated for ambient light conditions. Ambient light is measured with a sensor while the emitter is unpowered. If the measured ambient light is less than a current trip level (voltage level at the sensor), then a current level of light is measured with the sensor while the emitter is powered. If the measured current level of light exceeds the current trip level, then the signal output from the sensor indicates that an object such as an envelope awaiting postage to be printed thereon is present at the sensor. The current trip level may be determined by measuring light at the sensor when the emitter is on and adding some voltage margin to it, but if the sensor is blocked during this calibration a default threshold is used as the current trip level.

20 Claims, 5 Drawing Sheets

SYSTEM AND METHOD FOR SENSING PRESENCE OF MEDIA IN A MAILING MACHINE

FIELD

The exemplary and non-limiting embodiments of this invention relate generally to optical apparatus and methods for sensing objects in varying ambient light conditions, such as for example postage metering machines and similar mailing machine devices.

BACKGROUND

Mailing machines including postage metering systems often use optical mechanisms to sense the presence of an envelope in the requisite position before commencing printing of a postal indicium including the postage amount. Optical mechanisms may also be used to measure a physical dimension of a mail piece being processed by a mailing machine. One such postage metering machine is the DM 500 mailing machine available from Pitney Bowes Inc. of Stamford, Conn. The DM 500 mailing machine may accept envelopes that are typically already addressed and stuffed by the user. The envelopes are inserted at a feed end and are carried along a deck by a transport mechanism. Optical sensors detect presence of the envelope as it moves along the deck and trigger the transport means to move the envelope in position for the postage to be printed thereon. Furthermore, an optical sensor mechanism may be disposed along the transport mechanism path and used to measure a physical dimension such as the width of a mail piece such as a letter or a flat envelope. Such a physical dimension measurement may be used in determining the required applicable postage value using dimensional rating.

Such mailing machines are subject to widely varying ambient light conditions, such as when positioned near an office window. At some times of the workday the ambient light which leaks internal to the machine derives primarily if not fully from artificial lighting in the office, but mid-day on sunny days the ambient light level can be much higher from additive sunlight. Ambient light 'leaks' into the machine through a lateral gap which is the area in which the optical presence sensors are disposed (typically either along the deck or opposite it). The optical sensors are typically continuously scanned in order to detect presence of an envelope along the deck, but this varying ambient light condition in some cases cause the sensor to signal to the mailing machine that an object is present when in fact the sensor has detected only the elevated ambient light from the mid-day sun. In effect, sunlight saturates the sensors making the controlling software think that an envelope is covering them, which results in the system randomly starting up when no mail is present on the deck. Such an erroneous detection may be described as a false-detection.

In such cases, end users may be forced to draw blinds in a room, reorient the machine or place their postage metering machines in interior rooms to eliminate the high ambient light conditions from sunlight which trigger the false-detections noted above. But relying on end users to resolve a machine error may be problematic and limiting the placement of a mailing machine may not be practical for a particular installation. Accordingly, there is a need for a mailing machine having an optical sensor that more reliably functions in varying lighting conditions. The exemplary embodiments of the invention disclosed in the present application address several needs including at least the above mentioned false-detection issue.

SUMMARY

The foregoing and other problems are overcome, and other advantages are realized, at least in part by the use of the exemplary embodiments disclosed herein to illustrate this invention.

In a first aspect thereof, certain exemplary embodiments disclosed herein provide a method for calibrating an optical sensor for ambient light conditions. In this aspect the method comprises measuring ambient light with a sensor of an emitter-sensor pair while an emitter of the pair is not powered. Conditional on the measured ambient light being less than a current trip level, a current level of light is measured with the sensor while the emitter is powered. And conditional on the measured current level of light exceeding the current trip level, the method outputs from the sensor a signal indicating that an object is present at the sensor.

In a second aspect thereof, certain exemplary embodiments disclosed herein provide an emitter-sensor pair for a postage metering machine. In this aspect, the emitter-sensor pair comprises a sensor and an adjacent emitter configured to be powered independently of one another, and a processor. The processor is configured to compare ambient light, measured by the sensor and while the emitter of the pair is not powered, to a current trip level. The processor is also configured to apply power to both the sensor and the emitter for enabling the sensor to measure a current level of light. The processor is further configured, conditional on the measured current level of light exceeding a current trip level stored in a local computer readable memory, to operate a postage metering machine in accordance with an object being present at the at the sensor.

In a third aspect thereof, certain exemplary embodiments disclosed herein provide a computer readable memory storing a program of computer readable instructions that when executed by a processor result in certain particular actions. In this aspect the actions comprise: measuring ambient light with a sensor of an emitter-sensor pair while an emitter of the pair is not powered; conditional on the measured ambient light being less than a current trip level, measuring a current level of light with the sensor while the emitter is powered; and conditional on the measured current level of light exceeding the current trip level, outputting from the sensor a signal indicating that an object is present at the sensor.

These and other aspects of the invention are illustrated with reference to non-limiting embodiments as detailed below with particularity.

DETAILED DESCRIPTION

Figure 1:
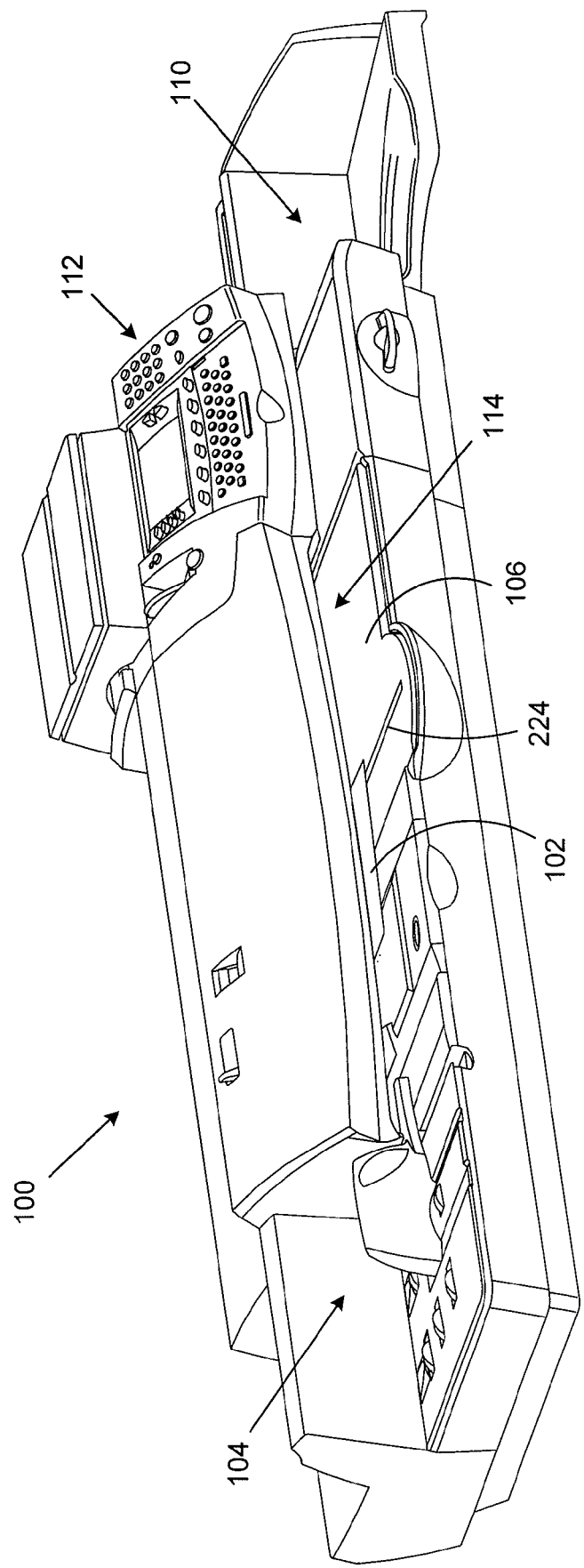
FIG. 1 is a perspective view of a mailing machine including a postage meter according to an illustrative embodiment of the present application.

Referring to FIG. 1, a perspective view of a mailing machine 100 including a postage meter for printing postal indicia according to an illustrative embodiment of the present application is shown. The illustrated mailing machine finishes mail pieces such as envelopes 102. The envelopes 102 are typically already addressed and stuffed with a letter or correspondence and are then are inserted at the feed end 104 of the mailing machine 100 by a user. The envelopes 102 are carried along a deck 106 by transport means which are disposed within the illustrated machine 100. Several optical sensors (not shown) are used to detect presence of the envelope 102 as it moves along the deck and trigger the transport means to move the envelope 102 in position for the postage to be printed thereon. Certain mailing machines feed the envelopes continuously along the deck without stopping or with minimal delay as the postage is printed, though other (e.g., older) systems may use a mechanical stop to halt travel of the envelope momentarily while the postage is printed. For the continuous-travel systems, printing of the postage is synchronized to the optical sensors which sense not only presence of the envelope 102 but sometimes also its position. Rate of travel is controlled by the transport means, and so once the leading edge of the envelope is detected the postage printing can be reliably timed to print at the correct position on the envelope 102. The envelope 102 is then ejected from the output end 110 of the machine 100 such as into an output bin. A user interface 112, shown at FIG. 1 as a graphical display and keypad, is also incorporated in the machine 100 for users to select from variable choices such as mailing class, and also to display text information to users such as envelope weight and postage amount.

Here, the mailing machine 100 also includes an optical sensor 224 for providing mail piece width measurements. The mail piece in the illustrative example is envelope 102 and it is transported over optical width sensor device 224 that includes a set of optical sensors. The optical sensor 224 is used to sense the width of the envelope 102 such as by determining whether a sensor in the sensor device 224 is covered by envelope 102 as it is transported down the transport path 106. While envelopes 102 are illustrated in FIG. 1, it is understood that mailing machines 100 may also print postage on other mail pieces such as postcards and on labels which may then be manually affixed to an envelope. Accordingly, the object being sensed is not limited to envelopes but extends to any media which passes through a mailing machine.

Because each time the machine 100 prints postage the amount is debited from a user's account or balance, it is important that the printed postage is actually affixed to the intended object. But often such postage metering machines 100 are subject to widely varying ambient light conditions, such as when positioned near an office window. At some times of the workday the ambient light which leaks internal to the machine derives primarily if not fully from artificial lighting in the office, but mid-day on sunny days the ambient light level can be much higher from additive sunlight. Ambient light 'leaks' into the machine through a lateral gap 114 which is the area in which the optical presence sensors are disposed (typically either along the deck 106 or opposite it). The optical presence sensors are continuously scanned in order to detect presence of an envelope 102 along the deck 106, but this varying ambient light condition in some cases cause the sensor to signal to the postage printing portion of the machine 100 that an object is present when in fact the sensor has detected only the elevated ambient light from the mid-day sun. In effect, sunlight saturates the sensors making the controlling software think that an envelope is covering them, which results in the system randomly starting up when no mail is present on the deck. Similarly, the optical width sensors may experience ambient light related errors.

To deal with such ambient light issues, users may place their postage metering machines in back rooms having no windows to eliminate a high ambient light condition from direct sunlight that might trigger the false-detections noted above. However, relying on end users to resolve an ambient light issue may not be preferable. In another alternative, the lateral gap 114 of the mailing machine may be reduced to obscure more of the ambient light which leaks to the sensors. However, such a configuration may renders the mailing machine unable to accommodate large (e.g., 9"×12") envelopes, or too bulky if it is made large enough to do so by closing the gap. As a further alternative, the threshold ambient light at which the sensor triggers might be adjusted so as to avoid the false detects in high ambient light conditions. However, such a configuration may render the mailing machine less sensitive to darker colored mail pieces, making the sensing less reliable. If the external ambient light or sunlight level is high enough, the sensor's detector will saturate and produce the maximum output, in which case it will not matter how high you set the trigger threshold, as the sensor can output no higher level.

Figure 2:
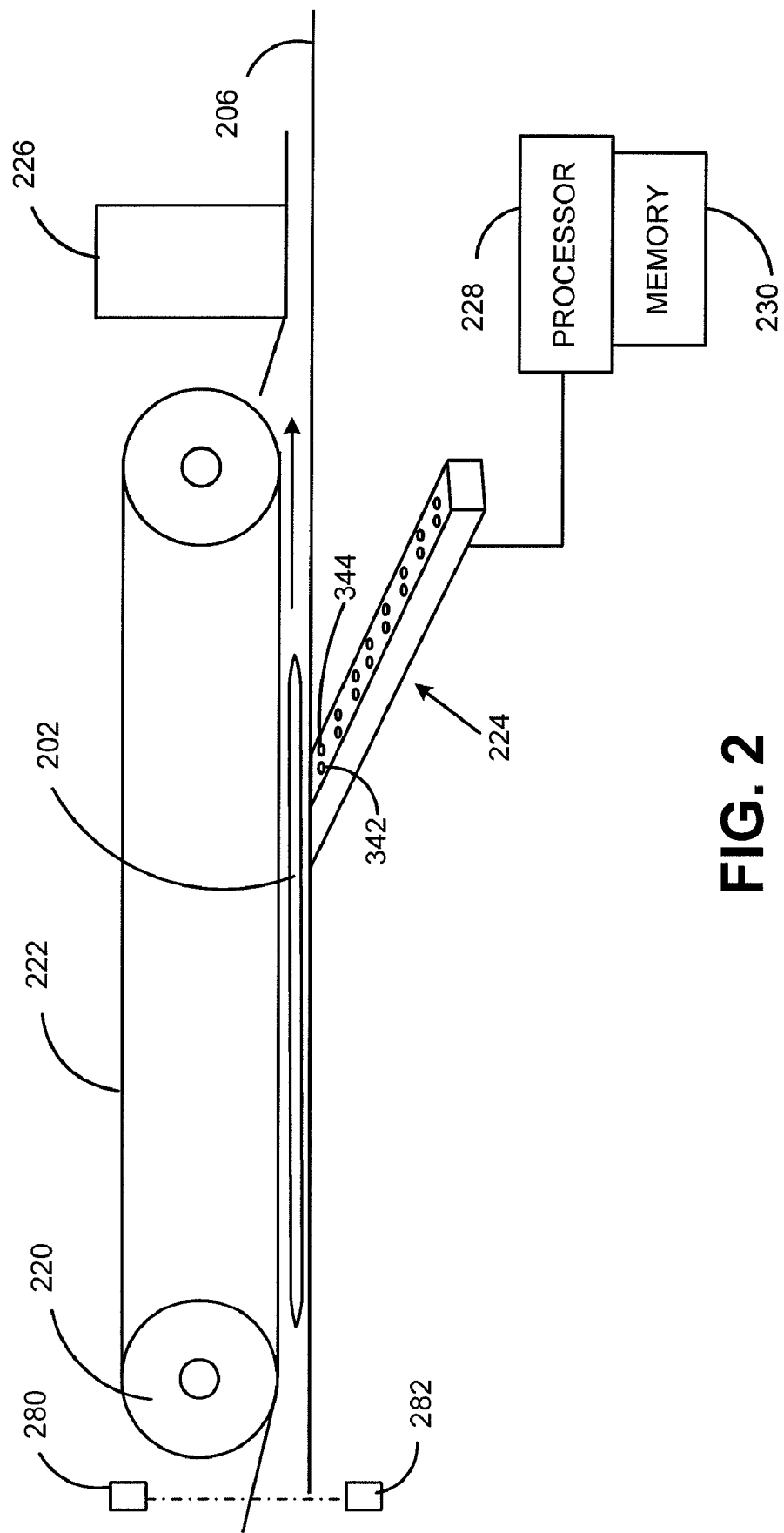
FIG. 2 is a schematic diagram of certain internal components of a mailing machine including optical sensors according to an illustrative embodiment of the present application.

Referring to FIG. 2, a schematic diagram of certain internal components of a mailing machine including optical sensors according to an illustrative embodiment of the present application is shown. FIG. 2 illustrates multiple optical sensors including a mail piece positioning sensor pair 280, 282 and a mail piece width sensor 224. Many postage metering machines sense the presence of an envelope along a transport path using individual optical sensor-emitter pairs. A bank of sensors (a set or array) is often used for mail width detection, whereas individual sensors (emitter/detector pairs) are used for linear position sensing of mail piece along the mail path. FIG. 2 illustrates a schematic view of relevant internal components of an exemplary but non-limiting postage metering machine which may be adapted according to these teachings. The envelope 202 is fed (individually or from a stack) onto the deck 206 where its presence is detected according to these teachings by one or more sensors such as sensor pair 280, 282. Once presence of the envelope is detected by the emitter-sensor pair 280, 282, a signal is sent to the transport means to begin driving the envelope 202 along the deck 206 in the feed direction (shown by the arrow), past the width sensor array 224 (with several sensor pairs 342, 344 and toward the output side of the postage metering machine. The upper surface of the width sensor bank 224 lies along the deck 206 and forms a part thereof. Prior to exiting, a postage printer 226 affixes postage to a designated portion of the envelope 202 and automatically deducts the value of the affixed postage from the user's pre-arranged account. Such optical sensing is detailed further below with reference to FIGS. 3-5.

The portion of the deck 206 which lies along the emitter-sensor bank 224 is transparent at least to a specified wavelength band which the sensors can detect. Such wavelength band may be in the visible or infrared range as is typical, though the sensors are not limited to those ranges individually or combined. The emitter-sensor bank 224 includes typically multiple pairs of emitters and sensors, and each sensor may be calibrated to its paired emitter. Embodiments described herein may operate with a single emitter-sensor pair, e.g. for detecting mail piece presence. However, multiple sensor pairs provide a failsafe mechanism in the event any single pair or portion thereof fails to function properly. While the emitter-sensor bank 224 shown at FIG. 2 lies perpendicular to the path of transport along the deck, it may alternatively be disposed in particular embodiments without departing from these teachings. Sensors positioned linearly along the mail path are typically used for mail position sensing, whereas sensors placed perpendicular to the mail path are typically used for mail width sensing.

The transport mechanism includes transport means and is activated by a control signal deriving from the detection using sensor pair 280, 282 of a mail piece object (envelope 202) being present. FIG. 2 illustrates an exemplary transport means as a driven roller 220 whose rotation causes an endless transport belt 222 to move the envelope 202 along the feed direction by friction 202. The roller/belt apparatus may be along the deck 206 or opposed it as shown at FIG. 2, and there may be multiple roller/belt assemblies which together move the envelope 202. Other mechanical transport means are known but the driven roller/transport belt arrangement is common. Alternatives to a friction-based transport means is a vacuum and blow mechanism which moves the envelope via air currents. The postage meter printer 226 may use inkjet printing, laserjet printing, physical stamping, or other printing means. The particular embodiment of the transport means and/or the postage printer are not limiting to the embodiments of the present application as presented herein.

There is also a processor 228 which controls the various components of the postage metering machine according to a computer readable software program stored on the local memory 230. The memory stores the program as well as threshold values and margin values as will be detailed below with respect to FIG. 5. The processor also receives data from the optical sensors including optical presence detector pair 280, 282 and optical width sensor bank 224, and while not shown so as not to clutter the drawings there are also operative control pathways between the processor 228 and the transport means 220/222 and postage printer 226.

The computer readable memory 230 may be of any type suitable to the local technical environment and may be implemented using any suitable data storage technology, such as semiconductor based memory devices, flash memory, magnetic memory devices and systems, optical memory devices and systems, fixed memory and removable memory. The processor 228 may be of any type suitable to the local technical environment, and may include one or more of general purpose computers, special purpose computers, microprocessors, digital signal processors (DSPs) and processors based on a multi-core processor architecture, as non-limiting examples. Either or both of the processor 228 and the computer readable memory 230 may be a single entity (single processor/chip or single physically distinct memory) or multiple entities (multiple processors acting in concert, physically and logically distinct memories).

From the above it can be appreciated that the optical sensors are an important part of the mailing machine and it is important to obtain relatively accurate sensor readings suitable for the presence and width sensing applications as described and for other optical sensing operations not described in detail herein. Optical sensor pair 280, 282 must relatively reliably and accurately detect the presence of an envelope 202 to enable automatic feeding of mail pieces into the feed path. From this detection, the transport means 220/222 is activated and the postage printer 226 is synchronized to print postage on the appropriate location of the article 202 being marked. As shown here, optical sensor 280, 282 is a through beam sensor in that the emitter and receiver are above and below the transport deck such that envelope 202 breaks the beam when it passes through the beam area. In contrast, optical detector 224 is a reflective sensor in that the emitter and sensor are both below the feed transport deck. The optical beam from emitter to sensor reflects from the mail piece or mailing machine component above the sensor array.

Figure 3:
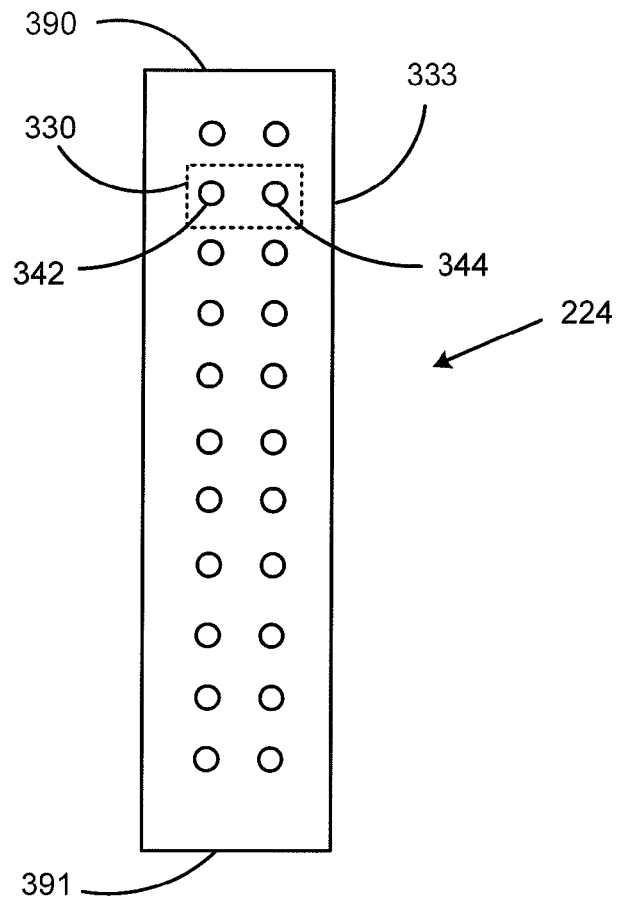
FIG. 3 is a plan view schematic diagram of an exemplary sensor-emitter component according to an illustrative embodiment of the present application.

Referring to FIG. 3, a plan view schematic diagram of an exemplary sensor-emitter component 224 according to an illustrative embodiment of the present application is shown. As illustrated there are multiple emitter-sensor pairs 330, one of which is offset by dashed lines. All of the emitter-sensor pairs lay within a housing of which at least the surface along or facing the deck 206 is a transparent window 333 as noted above. In this example, each sensor is disposed adjacent to its paired emitter. In one embodiment, each emitter is a diode and each sensor is adapted to sense radiation in the infra-red band, but not necessarily limited to that band. In other illustrative embodiments, other bandwidths may be used. For example, in a representative embodiment, the sensor may also be sensitive to light in the visible band which leads to the problem with high ambient light due to sunlight noted in the background section above. Moreover, sunlight also contains an infra-red component so it affects these sensors as well.

Figure 4:
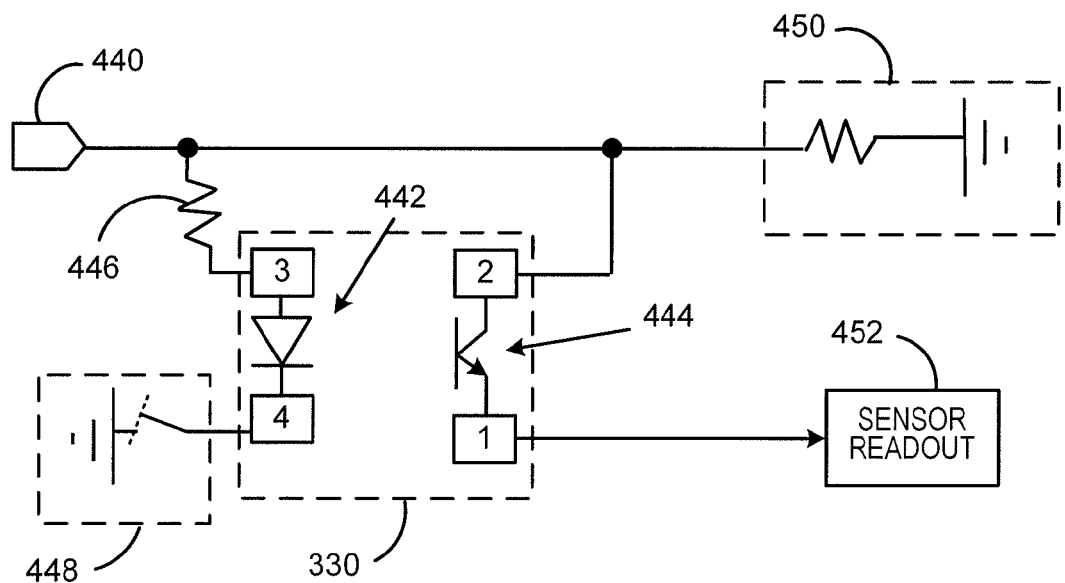
FIG. 4 is a circuit diagram for one sensor-emitter pair from FIG. 3 according to an illustrative embodiment of the present application.

In at least one embodiment, the emitter-sensor bank 224 has an enclosed housing with electrical leads or pins penetrating for hookup with external circuitry such as shown for example at FIG. 4. While there will be some reflection by the window 333 of light output by any of the emitters back to the internals of the enclosed housing, this is diffuse and generally of lesser intensity as sensed at any individual sensor than the intensity that individual sensor would sense from its adjacent and paired emitter reflected off an object at the sensors focal point, and so in an embodiment each sensor is calibrated to its adjacent and paired emitter as will be detailed with respect to FIG. 5. Light reflected back from the window 333 is accounted for in the sensor trigger level as will be described.

Additionally, the emitter-sensor pairs 330 used for mail width sensing are in at least one illustrative embodiment configured as absolute serial sensors, as opposed to incremental, which means once an individual sensor in the serially arranged pairs detects presence of an object, all other sensors which are serially arranged at positions inboard toward the registration wall from the actually-tripped sensor are automatically tripped, regardless of whether those inboard sensors independently detect presence of an object. In this manner, if a mail piece were to buckle off the deck in the center the true width could still be detected.

Referring to FIG. 4, a circuit diagram for one sensor-emitter pair from FIG. 3 according to an illustrative embodiment of the present application is shown. To understand the operation of several illustrative embodiments of the present application, another prior method is briefly described with respect to how it might operate with one prior circuit used (not shown). The one prior circuit included a set of 24 sensor pairs physically configured as a linear array and that were electrically organized in 4 banks, each bank having 6 sensor pairs in the respective row with the 6 sensor source diode cathodes ganged together in each row with each anode switched to ground. Accordingly, all sensor source diodes in a row would be powered on the same node. The sensor phototransistor detector emitters are all tied together to provide a sensor data signal. One optical sensor pair device that may be utilized is the GP2S700HCP device available from Sharp Corporation of Osaka, Japan. A positive voltage would first be applied to an emitter-detector pair at the source diode drive pin and the sensor collector pin. Power would be applied to those pins, and with the source diode emitter grounded at the cathode of the emitting diode, a voltage reading taken at the phototransistor detector emitter of the sensor would establish a background reading. The sensor is uncovered by any envelope/object for this background reading. Some margin would be added to this background to avoid marginal trips of the sensor that are false. During operation power is applied periodically (a fast cycle time) to the emitter-detector pair and if the light detected at the sensor exceeds the background reading plus the margin, it is assumed to be due to an object above the sensor reflecting more of the light from the emitter back toward the sensor and so the sensor signal is interpreted as the sensor having detected presence of an object. As in the background section above, if the ambient light exceeds the background level plus the margin, the sensor still triggers but the interpretation of that trigger as an object being present is a false detect.

Several embodiments of the present application differ in at least the following two respects over the aforementioned approach, detailed with respect to FIG. 4 which is an exemplary circuit diagram of one of the optical sensor emitter-detector pairs 330 from FIG. 3. In this circuit, the 24 sensor pairs are also physically organized as a linear array. However, the 24 sensor pairs are electrically configured with each of the 24 sensor pair emitter diode anodes separately driven by an appropriate FET such as a NDS356AP FET available from Fairchild Semiconductor and a drive signal such as a buffered drive signal. The 24 sensor pair emitter diode anodes are all ganged together and switched to ground by a single appropriate FET such as the SI2306DS FET available from Vishay Siliconix. The sensor phototransistor detector emitters are all tied together to provide a sensor data signal and the sensor phototransistor detector collectors are individually driven by the same signal as the respective sensor pair emitter diode anode. Now, each of the 24 sensor pair emitter diodes and corresponding sensor pair phototransistor collectors may be individually activated with the corresponding sensor data signal read for the corresponding sensor phototransistor detector. Additionally, each sensor pair may be individually calibrated with default, calibrated and other appropriate values stored in an appropriate memory array such as in an EEPROM device or in memory addressed by the main CPU.

In the calibration process of the present embodiment, each of the 24 sensor pairs are individually calibrated. The calibration for a representative sensor pair is described below. First, the background level of the phototransistor detector sensor 444 is read by applying power to pins 2 and 3 but the emitter 442 remains de-activated in that pin 4 is not grounded. FIG. 4 illustrates power being applied via switches 440 (specifically, field effect transistors FETs) which apply/disable power along the circuit line feeding pins 3 and 4, and illustrates coupling/de-coupling the sensor 442 from ground via a synchronization line switch 448. In certain embodiments of the present application, the detector/sensor 444 can be activated without activating the emitter 442.

While FIG. 4 illustrates a particular circuit arrangement to accomplish this as having a common power line feeding both sensor 442 at pin 3 and emitter 444 at pin 2 with a switch to ground 448 at pin 4 of the emitter 442, it can similarly be accomplished by switching power independently to the emitter 442 and sensor 444 with un-switched grounding connections (or with switched groundings also). Other circuit arrangements to enable similar functionality will be evident with minimal experimentation. Additionally for FIG. 4, in a preferred embodiment the sensor readout line 452 is clamped to ground except for taking a reading. This is done to minimize the electrical spikes due to the capacitive and inductive coupling of power being applied to pin 2.

The second distinction is doing a normal read at the sensor 444 with an object actually present. Both sensor 442 and emitter 444 are active for this 'normal' or 'standard' read, and so the voltage level at the sensor 444 is a 'normal' reading at which the sensor should always trip. This voltage level is just over the upward bound of a maximum or default calibration threshold, as will be detailed with respect to FIG. 5 below.

For completeness, FIG. 4 also includes a bleed resistor arrangement 450 to discharge energy stored in the power rail, system capacitors or other components once system energy is shut off, as is known in the art. A resistor 446 is also disposed between the emitter 442 power pin 3 and the power supply switch 440 to limit the current through the emitter LED.

Figure 5:
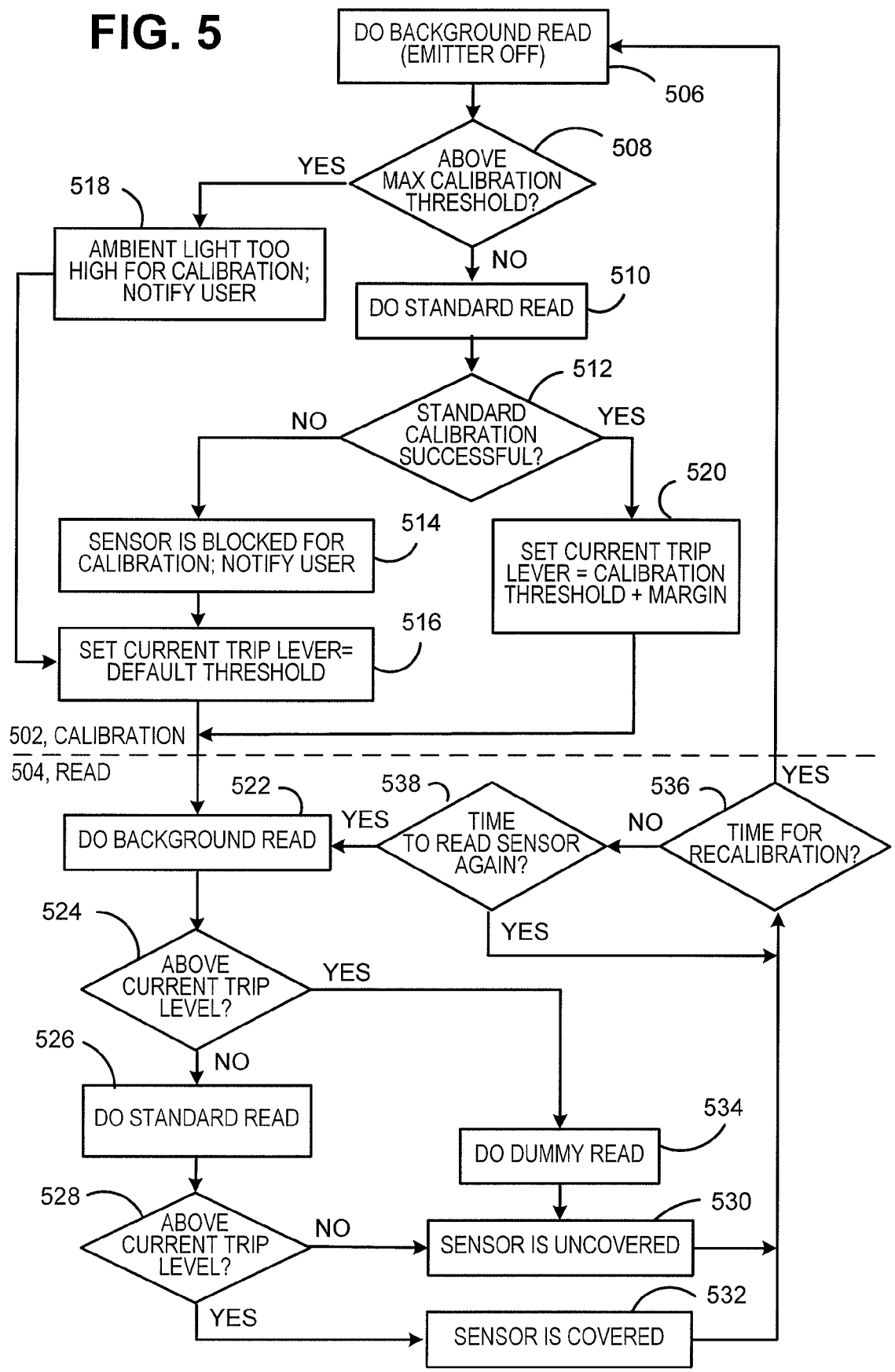
FIG. 5 is a logic flow diagram that illustrates the operation of a method, and a result of execution of computer program instructions embodied on a computer readable memory, in accordance with an illustrative embodiment of the present application.

FIG. 5 is a logic flow diagram that illustrates the operation of a representative method, and a result of execution of computer program instructions, in accordance with certain exemplary embodiments of the present application. FIG. 5 is for a single emitter-sensor pair 330 and may be executed independently for each of the multiple emitter-sensor pairs 330 of a single emitter-sensor bank 224, or it may be executed for a single emitter-sensor pair 330 of the entire bank 224 and the resulting current trip level from the calibration phase 502 is then used in common for all emitter-sensor pairs 330 within that same bank 224 for their separate read phases 504.

Consider the following highlights in the context of the more detailed procedures shown at FIG. 5. If the background reading (sensor on, emitter off) is above the maximum calibration level or the current trip level (depending on whether the calibration 502 or read 504 phase is active), the conclusion is that there is a high ambient light level but no object blocking the sensor/emitter pair 330. If the background reading is below the maximum calibration level (calibration phase 502) or the current trip level (read phase 504), then a standard reading (sensor and emitter both on) is taken to see if the standard read result is above the maximum calibration level or the current trip level for the respective phases 502/504. During a standard read, if the read value is above the maximum calibration level or the current trip level, then it is concluded that an object is present and covering the sensor.

The more detailed process lain out at FIG. 5 may be broadly divided as between calibration 502 and read 504. During calibration 502 (e.g., when power is first applied to the postage metering machine) the sensor's current trip level is determined, conveniently as a voltage. No object can be present (e.g., during initial powering-up of the postage metering machine) for calibration normally, else a default value is used for the current trip level. During the read 504 portion the measured voltages are compared against that current trip level (e.g., routine operation once the machine is ready for use after being powered-up).

In accordance with the exemplary method/program/apparatus embodiments of FIG. 5, at block 506 a background read is performed. As above, this is with the sensor 444 active/powered and the emitter 442 inactive/unpowered. As seen at FIG. 4, in an embodiment a unpowered emitter 442 can have positive voltage applied but no ground coupling and so the resulting open circuit remains unpowered and inactive. At block 508 this background read value is compared against a maximum calibration threshold, which in an embodiment is marginally below the covered-sensor reading but can be also constrained by some other value.

The maximum calibration threshold is stored in the memory 230, along with a default threshold and a current trip level (which is dynamic by the calibration phase 502). If at block 508 the background reading exceeds the maximum calibration threshold, then it is concluded that the ambient light level is too high at block 518, the user is notified via the user interface 112 (e.g., graphical display, audible alarm, etc), and the current trip level for the sensor 444 is set to the default level at block 516 which in the preferred embodiment is somewhat below the maximum calibration threshold. The maximum calibration and default threshold as well as the margin (block 520) are not adjusted once stored in the memory, except from time to time via normal maintenance and software updating apart from the process of FIG. 5. In that regard those three values are pre-determined; they are stored prior to the machine being initially powered-up for the calibration phase 502.

If instead the normal situation arises and the background read of block 506 does not exceed the maximum calibration threshold at block 508, then at block 510 a standard read is performed with both sensor 444 and emitter 442 powered. Block 512 checks that the sensor/emitter pair 330 is operational and not blocked by some object, in that some voltage below the maximum calibration threshold was read at the sensor 444. If the sensor is blocked, then at block 514 the user is again notified via the user interface 112 that normal calibration failed, and the current trip level is set to the default threshold value stored in the memory 230. If the standard calibration was successful at block 512, then at block then the calibration level sensed at block 512 in the normal read with both emitter 442 and sensor 444 powered is added to the margin stored in the memory and the result is stored as the current trip level. In an exemplary embodiment, the margin is about 350 mV to 1V and preferably is dependent on the arrangement of the emitter-sensor bank 224 and the reflective properties of its housing, particularly the window 333. The current trip level of block 520 does not exceed the maximum calibration threshold.

The end result of the calibration phase 502 is the current trip level, which in the event block 516 is used the current trip level is the default value stored in the memory. In other embodiments there need not be a default threshold and the postage metering machine simply does not operate without a proper calibration from this phase 502.

The read portion 504 of FIG. 5 represents the period of time when the postage metering machine is operational and sensing to detect if a user has inserted an object for postage or other handling. The current trip level throughout the read phase 504 results from the calibration phase 502 (output from blocks 516 or 520 as the case may be).

There is also a background read (emitter off, sensor on) done in the read phase 504 at block 522. If the background read is above the current trip level at block 524, then the ambient light has become too high and so a dummy read is done at 534 simply to keep the sensor heated according to its normal cycle so as not to inject a temperature variance to its sensitivity. It is a dummy read because its value is dumped via unclamping the ground along line 452 of FIG. 4, or the value is otherwise ignored. For the dummy read, block 530 concludes the sensor is uncovered since in fact there is no trigger signal that passes out of the dummy read block 534. The dummy read could also be used to tell block 536 that it is time for re-calibration in the calibration phase 502 which begins again at block 506. Time for re-calibration could also be determined by triggering off the system "start" button or waiting for a preset time to elapse in which the sensors are uncovered.

If instead the more normal occurrence of block 524 is that the background read of the read phase 504 is below the current trip level, then a standard read is performed at block 526 with both emitter 442 and sensor 444 powered on. The sensor voltage from that standard read is compared at block 528 to the current trip level and if the trip level is exceeded then at block 532 it is concluded the sensor is covered by an object. Not shown at FIG. 5, from block 532 the transport means 220/221 and postage printer 226 are controlled by the processor 228 to operate on the object which the sensor 444 sensed on the deck 206.

Block 536 allows re-calibration in the calibration phase 502 for the case of a dummy read, when ambient light has changed enough that the earlier calibration and trip level are no longer valid. Block 536 may also operate on a timer so that periodically it causes the system to re-compute a new current trip level. In that respect the re-calibration at block 536 may be event-based or time based or both. If it is not yet time or cause at block 536 for re-calibration, then block 538 imposes its own timer for the read loop previously detailed. This is a shorter time scale and simply unpowers the emitter 442 while the sensor 444 takes a background (ambient light only) read at block 522 where the process already described for the read phase 504 begins again using the earlier-determined current trip level.

It may happen that while block 538 is awaiting its timer expiration to initiate another background read 522 in the read phase 504, the timer in block 536 expires for performing a full re-calibration. In this case block 538 reverts to block 536 as shown and block 506 begins the calibration phase 502 which is re-executed to find a new current trip level.

There may also be a standard read loop of blocks 526-532/ 530 which runs more frequently than the dummy read 534 of the read phase 504. Either option keeps the sensors powered on a regular period to maintain a stable temperature profile, the distinction lying in how fast or slow the synch line switch 448 (FIG. 4) cycles the emitter 442 into and out of operation. FIG. 5 as depicted toggles that switch twice per standard read 526 in the read phase 504: open for the background read 522 and closed for the standard read 526.

The various blocks shown in FIG. 5 may be viewed as method steps, and/or as operations that result from operation of computer program code, and/or as a plurality of coupled logic circuit elements constructed to carry out the associated function(s). As can be appreciated, a software program executing the steps set forth at FIG. 5 (or at least some of those steps) can be uploaded to an existing postage metering machine to enable even a prior art machine to operate in accordance with these teachings, provided it has the requisite emitter-sensor pair 330 already. Note that the calibration 502 and read 504 phases are not mutually exclusive functions; the check at block 524 of the ambient light level measured at block 522 can also be considered a calibration, the difference being the ambient reading at block 522 in the read phase is compared against the current trip level whereas the background read at block 506 in the calibration phase 502 is compared against the maximum calibration threshold.

While the above description of FIG. 5 implied the process can be only in the calibration phase 502 or the read phase 504 at any given time, this is but one exemplary but non-limiting embodiment. Another is that the calibration phase 502 can compute a new current trip level while the former trip level is still in use in the read phase 504, with the new current trip level lying in wait at block 516/520 as the case may be until the timer for block 538 next expires.

From the above detailed description it can be appreciated that various methods, software programs, and apparatus according to these teachings calibrate a sensor for ambient light conditions by measuring ambient light with a sensor of an emitter-sensor pair while an emitter of the pair is unpowered (e.g., at block 522). Conditional on the measured ambient light being less than a current trip level (e.g., the comparing at block 524), a current level of light is measured with the sensor while the emitter is powered, the 'normal' or 'standard' read at block 526. Then, conditional on the measured current level of light exceeding the current trip level (the comparison at block 528), there is output from the sensor (e.g., along signal line 452) a signal indicating that an object is present at the sensor (sensor covered at block 532). Other elements of FIG. 5 add further details.

Figure 6:
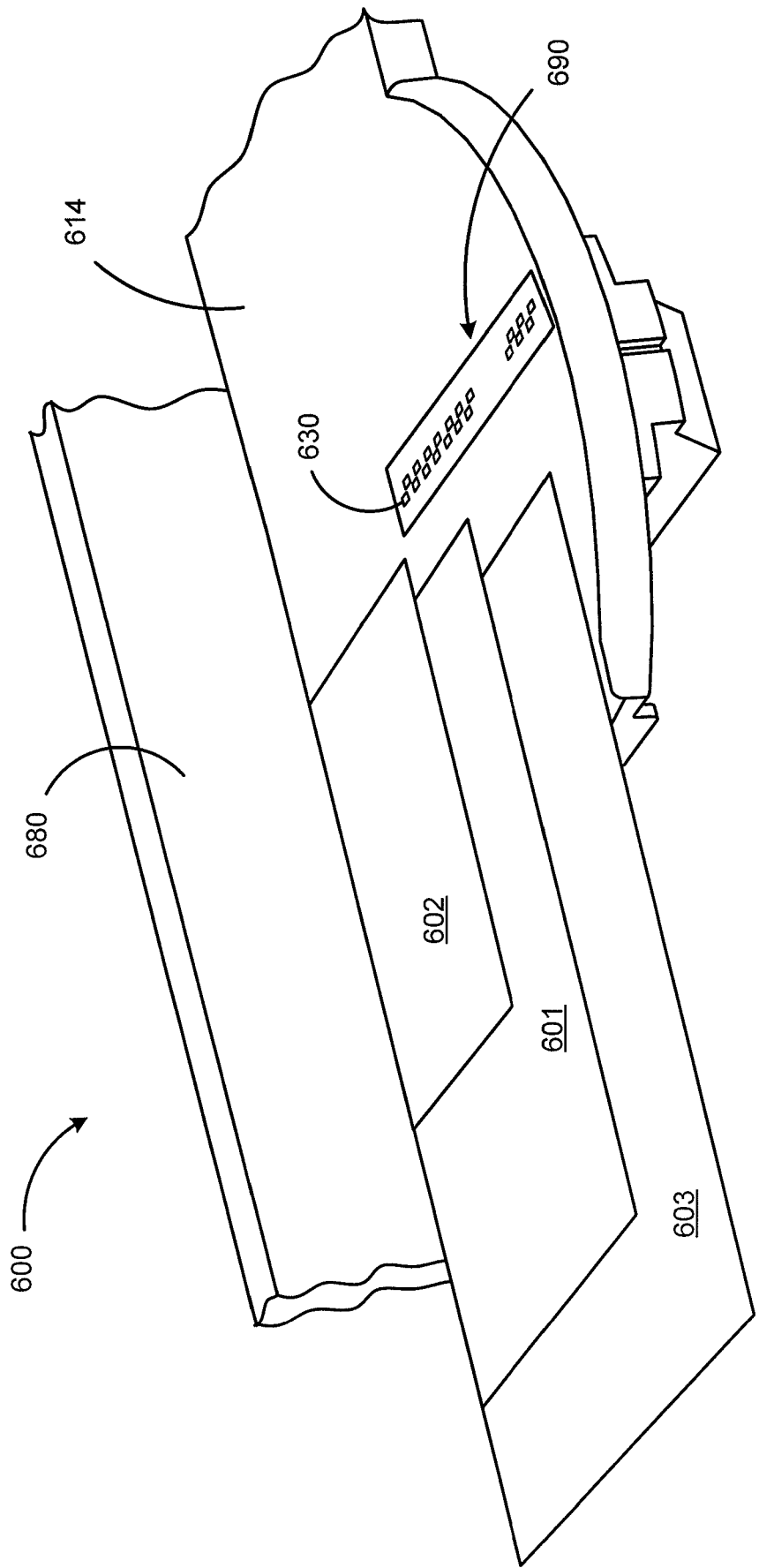
FIG. 6 is a plan view schematic diagram of a portion of a mailing machine including an optical width sensor according to an illustrative embodiment of the present application.

FIG. 6 is a plan view schematic diagram of a portion of a mailing machine including an optical width sensor according to an illustrative embodiment of the present application. Over and above the basic machine 100 shown at FIG. 1, there are also multi-task type mailing systems which incorporate one or more of the following: envelope stuffing, envelope content folding, collating, sorting (at either or both feed end 102 and output end 110), weighing, envelope sealing, and printing addresses. In those more involved systems still there is a sensor to detect presence of individual envelopes/objects prior to the postage being printed, but optical sensing may also be used in other components of the multi-task mailing systems for sensing the presence of objects for any of those various other tasks. For example, optical object presence sensing may be employed to sense the presence of folded envelope contents for synchronizing with the task of automatically stuffing the waiting envelope, to sense presence of the stuffed envelope for automatically moisturizing the envelope flap prior to sealing it, etc. These teachings may also be employed to calibrate and control operation of sensors for those other object-sensing purposes as well as for the purpose of actuating the transport means and affixing postage.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosed embodiments and the invention is not necessarily limited thereto. While various aspects of the exemplary embodiments of the present application may be illustrated and described as block diagrams, flow charts, schematic diagrams and circuits, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the present application may be practiced in various components such as integrated circuit chips and modules, and that the exemplary embodiments of the present application may be realized in an apparatus that is embodied as an integrated circuit. The integrated circuit, or circuits, may comprise circuitry (as well as possibly firmware) for embodying at least one or more of a data processor or data processors, and/or circuitry that is/are configurable so as to operate in accordance with the exemplary embodiments of the present application.

Various modifications and adaptations to the foregoing exemplary embodiments of the present application may become apparent to those skilled in the relevant arts in view of the foregoing description, when read in conjunction with the accompanying drawings. However, any and all modifications will still fall within the scope of the non-limiting and exemplary embodiments of the present application.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be wired or wireless, physical or logical, or some combination of these.

Furthermore, some of the features of the various non-limiting and exemplary embodiments of the present application may be used to advantage without the corresponding use of other features. As such, the foregoing description should be considered as merely illustrative of the principles, teachings and exemplary embodiments of this invention, and not in limitation thereof.

What is claimed is:

1. A method for calibrating a sensor for ambient light conditions, the method comprising:
   measuring ambient light with a sensor of an emitter-sensor pair while an emitter of the pair is unpowered;
   conditional on the measured ambient light being less than a current trip level, measuring a current level of light with the sensor while the emitter is powered;
   conditional on the measured current level of light exceeding the current trip level, outputting from the sensor a signal indicating that an object is present at the sensor.

2. The method according to claim 1, further comprising, for a case in which the measured ambient light is greater than the current trip level, computing a new trip level and re-executing the method of claim 1 using the new trip level in place of the current trip level.

3. The method according to claim 2, wherein computing the new trip level comprises, during a calibration phase:
   while no object is present at the sensor, determining a calibration threshold by again measuring a current level of light with the sensor while the emitter is powered;
   adding a pre-determined margin to the determined calibration threshold; and
   setting the new trip level in dependence on the sum of the calibration threshold and the pre-determined margin.

4. The method according to claim 3, in which the pre-determined margin is retrieved from a local computer readable memory and is dependent on at least reflection from a transparent window overlying the emitter-sensor pair.

5. The method according to claim 3, wherein the calibration phase further comprises, prior to determining the calibration threshold:
   again measuring ambient light with the sensor of the emitter-sensor pair while the emitter of the pair is unpowered; and
   comparing the again measured ambient light against a maximum calibration threshold stored in a local computer-readable memory;
in which determining the calibration threshold is conditional on the again measured ambient light being less than the maximum calibration threshold.

6. The method according to claim 2, wherein computing the new trip level comprises, during a calibration phase:
   again measuring ambient light with the sensor of the emitter-sensor pair while the emitter of the pair is unpowered;
   comparing the again measured ambient light against a maximum calibration threshold stored in a local computer-readable memory; and
   conditional on the again measured ambient light being greater than the maximum calibration threshold, using a default calibration threshold stored in the local computer-readable memory as the new trip level.

7. The method according to claim 1 operating in a loop over a plurality of iterations, in which during at least one iteration the measured ambient light is greater than a current trip level, in which case for that iteration the sensor and the emitter are both powered and a resulting signal from the sensor is ignored.

8. The method according to claim 7, in which the iterations occur at a frequency selected such that the sensor remains at a substantially stable temperature.

9. The method according to claim 1, in which the emitter-sensor pair is disposed in a postage metering machine which comprises transport means and a postage printer, and the signal output from the sensor which indicates that an object is present at the sensor is used to actuate the transport means for moving the object towards the postage printer.

10. An emitter-sensor pair for a postage metering machine, comprising:
    a sensor and an adjacent emitter configured to be powered independently of one another;
    a processor configured to:
        compare ambient light, measured by the sensor and while the emitter of the pair is unpowered to a current trip level;
        apply power to both the sensor and the emitter for enabling the sensor to measure a current level of light; and
        conditional on the measured current level of light exceeding a current trip level stored in a local computer readable memory, to operate a postage metering machine in accordance with an object being present at the sensor.

11. The emitter-sensor pair according to claim 10, in which the processor is configured, for a case in which the measured ambient light is greater than the current trip level, to compute a new trip level and to again compare the ambient light, apply power and operate the postage metering machine using the new trip level in place of the current trip level.

12. The emitter-sensor pair according to claim 11, in which the processor is configured to compute the new trip level during a calibration phase by:
    while no object is present at the sensor, determine a calibration threshold from a new current level of light measured by the sensor while the emitter is powered;
    add a pre-determined margin stored in the local computer readable memory to the determined calibration threshold; and
    set the new trip level in dependence on the sum of the calibration threshold and the pre-determined margin.

13. The emitter-sensor pair according to claim 12, in which the processor is configured to retrieve the pre-determined margin from the local computer readable memory, wherein said pre-determined margin is dependent on at least reflection from a transparent window overlying the emitter-sensor pair.

14. The emitter-sensor pair according to claim 12, in which the calibration phase is characterized in that, prior to the processor determining the calibration threshold:
    the sensor is configured to again measure ambient light while the emitter is unpowered; and
    the processor is configured to compare the again measured ambient light against a maximum calibration threshold stored in the local computer-readable memory;
    in which the processor is configured to determine the calibration threshold conditional on the again measured ambient light being less than the maximum calibration threshold.

15. The emitter-sensor pair according to claim 11, in which the calibration phase is characterized in that:
    the sensor is configured to again measure ambient light while the emitter of the pair is unpowered;
    the processor is configured to compare the again measured ambient light against a maximum calibration threshold stored in a local computer-readable memory; and
    the processor is configured, conditional on the again measured ambient light being greater than the maximum calibration threshold, to use a default calibration threshold stored in the local computer-readable memory as the new trip level.

16. The emitter-sensor pair according to claim 10, in which the processor is configured to ignore a signal output from the sensor which arises when both the sensor and the emitter are both powered for the case where the measured ambient light is greater than a current trip level immediately prior to the sensor and emitter both being powered.

17. The emitter-sensor pair according to claim 10, in which the emitter-sensor pair is disposed in a postage metering machine which comprises transport means and a postage printer, and the controller is configured to use the signal output from the sensor which indicates that an object is present at the sensor to actuate the transport means for moving the object towards the postage printer.

18. A non-transitory computer readable memory storing a program of computer readable instructions that when executed by a processor result in actions comprising:
    measuring ambient light with a sensor of an emitter-sensor pair while an emitter of the pair is unpowered;
    conditional on the measured ambient light being less than a current trip level, measuring a current level of light with the sensor while the emitter is powered; and
    conditional on the measured current level of light exceeding the current trip level, outputting from the sensor a signal indicating that an object is present at the sensor.

19. The computer readable memory according to claim 18, in which the actions further comprise, for a case in which the measured ambient light is greater than the current trip level, computing a new trip level and re-executing the method of claim 1 using the new trip level in place of the current trip level, wherein computing the new trip level comprises, during a calibration phase:
    again measuring ambient light with the sensor of the emitter-sensor pair while the emitter of the pair is unpowered;
    comparing the again measured ambient light against a maximum calibration threshold stored in a local computer-readable memory; and
    conditional on the again measured ambient light being greater than the maximum calibration threshold, using a default calibration threshold stored in the local computer-readable memory as the new trip level.

20. The computer readable memory according to claim 19, wherein computing the new trip level comprises, during a calibration phase:
    while no object is present at the sensor, determining a calibration threshold by again measuring a current level of light with the sensor while the emitter is powered;
    adding a pre-determined margin to the determined calibration threshold; and
    setting the new trip level in dependence on the sum of the calibration threshold and the pre-determined margin, wherein actions in the calibration phase further comprises, prior to determining the calibration threshold:
    again measuring ambient light with the sensor of the emitter-sensor pair while the emitter of the pair is unpowered; and
    comparing the again measured ambient light against a maximum calibration threshold stored in a local computer-readable memory;
    in which determining the calibration threshold is conditional on the again measured ambient light being less than the maximum calibration threshold.

* * * * *